United States Patent [19]

Felcht et al.

[11] Patent Number: 4,550,161

[45] Date of Patent: Oct. 29, 1985

[54] PREPARING WATER-SOLUBLE MIXED CELLULOSE ETHERS

[75] Inventors: Utz-Hellmuth Felcht, Bad Soden; Gerhard Buchberger, Wiesbaden-Auringen, both of Fed. Rep. of Germany

[73] Assignee: Hoechst Aktiengesellschaft, Fed. Rep. of Germany

[21] Appl. No.: 605,192

[22] Filed: Apr. 27, 1984

Related U.S. Application Data

[63] Continuation-in-part of Ser. No. 443,104, Nov. 19, 1982, Pat. No. 4,460,766.

[30] Foreign Application Priority Data

May 3, 1983 [DE] Fed. Rep. of Germany ....... 3316124

[51] Int. Cl.$^4$ ............................................ C08B 11/193
[52] U.S. Cl. ........................................ 536/90; 536/91; 536/95; 536/96
[58] Field of Search ......................... 536/90, 91, 95, 96

[56] References Cited

U.S. PATENT DOCUMENTS

| 3,251,825 | 5/1966 | Haidasch | 536/90 |
| 3,388,082 | 6/1968 | Rodgers | 536/91 |
| 3,839,319 | 10/1974 | Greminger et al. | 536/91 |
| 4,096,325 | 6/1978 | Teng et al. | 536/91 |
| 4,358,587 | 11/1982 | Brandt et al. | 536/90 |
| 4,456,751 | 6/1984 | Messelt et al. | 536/91 |
| 4,460,766 | 7/1984 | Felcht et al. | 536/91 |

FOREIGN PATENT DOCUMENTS

| 3147434 | 6/1983 | Fed. Rep. of Germany . | |
| 1295128 | 4/1962 | France . | |
| 1497780 | 9/1967 | France . | |
| 734924 | 8/1955 | United Kingdom . | |
| 833834 | 5/1960 | United Kingdom . | |
| 973952 | 11/1964 | United Kingdom | 536/91 |
| 1003662 | 9/1965 | United Kingdom . | |
| 397519 | 11/1974 | U.S.S.R. . | |

OTHER PUBLICATIONS

Ullmanns Encyklopädie der technischen Chemie, Band 9, Stichwort "Celluloseäther", Verlag Chemie-Weinheim, 4, Auflage 1975, S. 192ff.

Primary Examiner—Ronald W. Griffin
Attorney, Agent, or Firm—Berman, Aisenberg & Platt

[57] ABSTRACT

The process for preparing mixed cellulose ethers proceeds in the following steps:

(a) alkalizing of the cellulose,
(b) etherifying of the alkali cellulose in the presence of a base by using at least one etherifying agent which requires, for the reaction with cellulose, a catalytic and sub-stoichiometric quantity of a base, and
(c) increasing the quantity of base, and
(d) etherifying the cellulose ether so prepared by using at least one etherifying agent which requires, for the reaction with cellulose, an at least stoichiometric quantity of a base or a catalytic and substoichiometric quantity of a base, increased over the quantity used in (a), with at least one inert organic solvent being used as a dispersing auxiliary in at least one of the steps and water being present in all steps, wherein mixed etherification leads to a water-soluble product and dimethoxyethane, an alkanol, an alkanediol and/or an alkoxyalkanol are used as the organic solvents. The process serves, in particular, for the preparation of methyl-hydroxyethyl cellulose or methyl-hydroxypropyl cellulose.

15 Claims, No Drawings

PREPARING WATER-SOLUBLE MIXED CELLULOSE ETHERS

RELATED APPLICATION

This application is a continuation-in-part of application Ser. No. 443,104, filed Nov. 19, 1982, and now U.S. Pat. No. 4,460,766.

TECHNICAL FIELD

The present invention relates to a three-reaction-step process for preparing water-soluble mixed cellulose ethers.

BACKGROUND OF THE INVENTION

The preparation of cellulose ethers having uniform or different types of ether substituents is known [see, for example, "Ullmanns Ecyklopaedie der technischen Chemie" (Ullmann's Encyclopedia of Industrial Chemistry), Volume 9, keyword "cellulose ethers", Verlag Chemie-Weinheim, 4th edition 1975, page 192 et seq.], these being prepared, in general, either (a) by the principle of Williamson's ether synthesis by reacting cellulose with alkyl halides or aralkyl halides (with the stoichiometric consumption of a base) and/or (b) by reacting cellulose with activated reactants which are capable of directly reacting with hydroxyl groups in the presence of catalytic, i.e. sub-stoichiometric, quantities of a base:

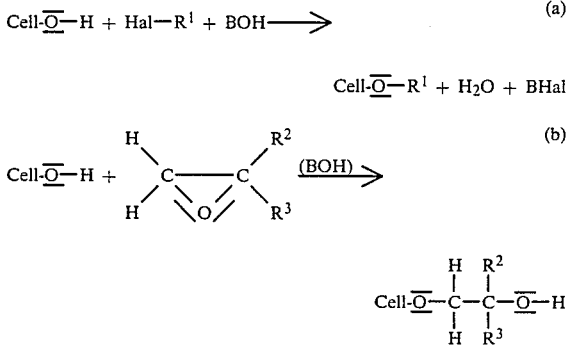

In these general equations:

Cell-$\overline{O}$-H denotes, on the cellulose molecule, a hydroxyl group which is to be etherified, Hal denotes chlorine or bromine, $R^1$ denotes a $C_1$ to $C_{15}$ alkyl radical, a $C_7$ to $C_{15}$ aralkyl radical, a carboxy($C_1$–$C_3$alkyl) radical, a $C_1$ to $C_3$ sulfonoalkyl radical, a $C_1$ to $C_3$ phosphonoalkyl radical, a $C_1$ to $C_6$ hydroxyalkyl radical or an N,N-dialkylaminoalkyl radical in which each alkyl group has from 1 to 3 carbon atoms, each of $R^2$ and $R^3$ denotes hydrogen (H) or a $C_1$ to $C_{13}$ alkyl radical, $R^2$ being identical with $R^3$ or different therefrom, BOH denotes a base, such as alkali-metal hydroxide (e.g. NaOH) or alkaline-earth-metal hydroxide or a quaternary ammonium base.

For preparing mixed ethers of cellulose, various etherifying agents are allowed to act simultaneously or stepwise on cellulose. For this purpose, reactions according to only one of the indicated variants (a) or (b), but particularly reactions according to both variants, are carried out. The following are examples of reaction products which can be prepared by variant (a): methyl cellulose (MC), benzyl cellulose (BC), carboxymethyl cellulose (CMC), sulfonoethyl cellulose (SEC), phosphonomethyl cellulose (PMC), or N,N-diethylaminoethyl cellulose (DEAEC). The following are examples of reaction products which can be prepared by variant (b): hydroxyethyl cellulose (HEC), or hydroxypropyl cellulose (HPC). Mixed ethers of cellulose which can be prepared by any one or both of the indicated variant(s) include, for example, methyl hydroxyethyl cellulose (MHEC), ethyl hydroxyethyl cellulose (EHEC), hydroxyethyl hydroxypropyl cellulose (HEHPC), methyl carboxymethyl cellulose (MCMC), hydroxyethyl phosphonomethyl cellulose (HEPMC), or methyl hydroxyethyl hydroxypropyl cellulose (MHEHPC). Within the scope of the statements below, the term "cellulose ethers" includes both products having a unitary substituent, such as hydroxyethyl cellulose, and products having at least two different substituents, such as methyl carboxymethyl cellulose.

Most known processes for preparing cellulose ethers are carried out in two main steps:
1. The preparation of the "alkali cellulose".
2. The etherification of the cellulose molecule.

For preparing the "alkali cellulose", cellulose in a finely-divided (for example ground) form is mixed as homogeneously as possible in suitable technical equipment with water and alkali-metal hydroxide (in general NaOH, but other bases, such as quaternary ammonium bases, are also useful for this purpose). The alkali-metal hydroxide can be used in a solid form or in the form of an aqueous solution. For the etherification reaction itself and thus for the quality of the end product of the reaction, the uniformity and intensity of mixing is of decisive importance.

Alkalization is generally effected at as low a temperature as possible, for example, room temperature or below, in order to suppress degradation of the polymer (the so-called "ripening"); however, under certain circumstances, for example, the subsequent preparation of low-viscosity cellulose ethers, this degradation may be desirable. The etherifying agent is optionally added as early as the alkalization step, but in this case the temperature must generally be increased, in order to carry out the actual etherification reaction.

The actual etherification step is generally conducted by heating the alkali cellulose, produced in the first step, together with an etherifying agent (which has been added in the meantime) to temperatures between 30° C. and 120° C. It is also possible to remove, in advance, part of the water present in the first step. Vigorous mixing in the second step is also very important for the quality of the reaction product and for the cost-efficiency of the process, since, for example, it is desirable to have a good yield in the substitution reaction, while employing as small a quantity as possible of the etherifying agent(s).

Both continuous and discontinuous procedures are known for the two reaction steps. In the case of particular reactants, it is also possible to combine the two steps in such a way that pre-alkalization of the cellulose does not take place. Dispersing auxiliaries (suspending agents) are optionally employed in both steps, or at least in one of the two steps, in order to achieve better mixing of the heterogeneous reaction mixture. For this purpose, organic solvents which are either soluble in water or more or less insoluble in water are known from the state of the art, including, for example:

Ethylene glycol monoalkyl ether, ethylene glycol diethyl ether, dioxane, tetrahydrofuran, $C_1$ to $C_6$ alkanols (in particular isopropanol or tert.-butanol), ($C_1$ to $C_4$)alkoxy($C_1$ to $C_6$)alkanols, toluene, heptane, mixtures of carbon tetrachloride and ethanol, acetone, methyl ethyl ketone; mixtures of benzene, toluene or xylene and ethanol; ethylene or propylene glycols, dioxane, mixtures of $C_6$ and higher alkanes, aromatic compounds, aliphatic ketones, aliphatic ethers or $C_2$ to $C_4$ halogenated alkanes and $C_1$ to $C_6$ alkanols, dimethyl sulfoxide, dioxane or tetrahydrofuran; xylene or a mixture of tert.-butanol and acetone, mixtures of $C_5$ to $C_{10}$ alkanes or $C_6$ to $C_{12}$ aromatic compounds and $C_1$ to $C_4$ alkanols. Recently, an ethylene glycol diether, viz. dimethoxyethane, has been proposed for use as a new organic solvent in this field of application.

In German Offenlegungsschrift No. 3,147,434 of earlier priority date, which has not been previously published, a process for the preparation of cellulose ethers is described, which is carried out in the presence or water, bases, and at least one inert organic solvent comprising dimethoxyethane. According to another patent application (German Offenlegungsschrift No. 3,306,621 of earlier priority date, which has also not been previously published) a solvent mixture is employed in the preparation of cellulose ethers. This solvent mixture contains dimethoxyethane and, additionally, at least one further organic solvent, selected from the group consisting of alkanols, alkanediols, and alkoxyalkanols.

In practice, there is the problem that for the preparation of cellulose ethers according to the above-defined production variant (a), at least stoichiometric quantities of alkali-metal hydroxide must be used, relative to the desired degree of reaction of the alkyl halides or aralkyl halides. In the preparation of cellulose ethers according to production variant (b), on the other hand, only catalytic quantities of alkali-metal hydroxide are required.

As is known, too much alkali-metal hydroxide used in production variant (b) results in an impaired efficiency for the reaction with the etherifying agent. In this connection, efficiency is defined as the quotient of degree of substitution attained and total dosage of etherifying agent, multiplied by 100. When it is desired to prepare mixed ethers of cellulose and it is intended, for this purpose, to introduce, for example, two substituents, one of which is introduced according to production variant (a) and the other according to production variant (b), it is, for technical and economical reasons, necessary to conduct the process in such a way that the efficiency of reaction obtained with both etherifying agents is as high as possible. This is, however, contradicted by the actually required dosage of alkali-metal hydroxide, which must be practically stoichiometric for production variant (a). Examples of mixed ethers of this kind, in the preparation of which one substituent is introduced according to reaction variant (a) and the other according to reaction variant (b), are MHEC, MHPC, CMHEC or EHEC.

A similar absolute dependence also exists in the case of mixed ethers, in the preparation of which at least two different substituents are introduced, either exclusively according to variant (a) or exclusively according to variant (b). For this purpose, it may be necessary either to employ different quantities of alkali-metal hydroxide for the respective catalytically-influenced reaction or to use different conditions of reaction, because of widely varying reactivities of the etherifying agents. Examples of mixed cellulose ethers of this type are HEHPC, MCMC or HEHBC.

It has therefore been attempted to solve these problems by a number of processes which have been described in the past and in which, in the preparation of mixed cellulose ethers having, for example, two different substituents, etherification is carried out in two steps.

USSR-Pat. No. 397,519 describes a process for producing MHPC in two steps, by hydroxypropylation of a squeezed and disintegrated alkali cellulose (prepared with a 17 to 22% strength NaOH solution), at a ratio of propylene oxide to cellulose ranging from 0.9:1 to 1.5:1. NaOH in the form of a powder is then added in quantities of 0.5 to 0.7 part by weight per 1 part by weight of cellulose and, finally, methylation is carried out. It is stated that the reaction products comprise from 17 to 25% of hydroxypropyl groups and from 24 to 30% of methoxyl groups and that they are soluble in cold water and organic solvents; the process is discontinuously conducted. Disadvantages of the process are that (a) NaOH is used in the form of a powder, which, as is known, leads to a very irregular alkalization and thus also to products of mediocre quality, and (b) liquid dispersing auxiliaries are not used, which also results in products which are only non-uniformly etherified and show relatively high proportions of residues. Moreover, the process is apparently only suitable for the production of MHPC.

U.S. Pat. No. 4,096,325 discloses a process for preparing MHPC, in which alkali cellulose is first reacted with propylene oxide, in the presence of toluene, hexane, or DMF, at a ratio of propylene oxide to cellulose ranging from 1:1 to 8:1 and at a temperature of up to 110° C. After a $MS_{HP}$ of about 0.5 to 7.0 has been attained, the organic solvent is mechanically removed (e.g. by filtering off or decanting). Upon adding fresh solvent, fresh NaOH, water, and methyl chloride, reaction is further conducted at 40° to 75° C., until a $DS_M$ of about 1 to 2.4 has been reached. According to example 2, the solvent may possibly be left in the product, but in that case the second etherification is already partly carried out in the first step. Disadvantages of this process are (a) the mechanical removal of the liquid components after the first step, which is hardly economical and is often detrimental to the product, (b) the substantial insolubility of the reaction products in pure water and also (c) the use of rather high-boiling organic solvents, some of which are, moreover, insoluble in water.

The two-step process of preparing water-soluble mixed cellulose ethers according to German Pat. No. 1,493,247 (equivalent of British Pat. No. 1,003,662) is carried out in such a way that (a) cellulose is alkalized with a 15 to 25% strength aqueous NaOH solution, (b) the alkali cellulose is squeezed off and is then reacted with gaseous alkyl halide or acrylonitrile, up to a DS from 0.05 to 0.5, (c) the amount of alkali is then reduced to less than 10% of the weight of the cellulose by washing with water and squeezing off, (d) the thus pretreated cellulose is thereafter gradually reacted with gaseous alkylene oxide, until a MS of more than 1 is attained and (e) the unreacted alkylene oxide is finally removed; the remaining small amount of residual alkali in the product is neutralized in the gaseous phase. This process has the disadvantages that (a) liquid dispersion auxiliaries are not used, which leads to non-uniformly etherified products and (b) alkylation [as an example of the above-defined process variant (a)] is conducted in the first etherification step, so that the resulting intermediate product contains a comparatively high amount of residual alkali and must therefore be intermediately purified by washing before the second etherification step is carried out. Moreover, although it is maintained that etherification with gaseous etherifying agents yields better products, it is known to any person of ordinary skill in this field that a gas/solids interaction results in less uniformly etherified products than carrying out reaction with the aid of a dispersing auxiliary which is capable of dissolving the etherifying agent and thus renders possible a more intensive and more effective interaction between the components.

German Auslegeschrift No. 1,222,030 (equivalent of British Pat. No. 833,834) describes a method of preparing water-soluble and thermoplastic methyl-hydroxyalkyl celluloses, in which (a) cellulose is treated with an aqueous alkali-metal hydroxide solution of 30 to 60% strength until a weight ratio NaOH:cellulose in the range from 0.7 to 1.5 is attained and (b) the alkali cellulose is, successively or simultaneously, reacted with a hydroxyalkylating agent and methyl chloride, using, per part by weight of cellulose, from 0.25 to 0.8 part by weight of propylene oxide or molecularly equivalent amounts of ethylene oxide or from 0.15 to 0.8 part by weight of butylene oxide and from 1.1 to 2.0 parts by weight of methyl chloride. The reaction is first run at a temperature of up to 40° C., which is then gradually increased to not more than 80° C. This method has the disadvantages that (a) liquid dispersing auxiliaries are not employed, (b) a single alkalization step is carried out, so that the amount of alkali present before the hydroxyalkylation is too high, which leads to side reactions (hydrolysis of the alkylene oxide into alkylene glycols), and (c) the methyl chloride and propylene oxide used have a low percentage of activity of only 35% and 14%, respectively (according to example 1).

SUMMARY OF THE INVENTION

An object of the present invention is to provide a process for preparing water-soluble mixed cellulose ethers, i.e. cellulose ethers having at least two different types of substituents, in which the products can be prepared in an economical manner, i.e. particularly at a high-selective efficiency in the etherification steps, and show an excellent product quality, i.e. uniform etherification and thus good solubility characteristics and the smallest possible or even no residue.

The invention is based on a process for preparing mixed cellulose ethers, which comprises:
(a) alkalizing cellulose,
(b) etherifying the alkalized cellulose in the presence of a base by using at least one etherifying agent which requires, for reaction with cellulose, a catalytic and sub-stoichiometric quantity of a base,
(c) increasing the quantity of base, and
(d) etherifying the cellulose ether so prepared by using at least one etherifying agent [which requires, for the reaction with cellulose, an at least stoichiometric quantity of a base or a catalytic and sub-stoichiometric quantity of a base which is increased over the quantity used in (a)], with at least one inert organic solvent being used as a dispersing auxiliary in at least one of the steps and water being present in all steps. In the process of the present invention, mixed etherification leads to a water-soluble product, and dimethoxyethane, an alkanol, an alkanediol and/or an alkoxyalkanol are used as the organic solvents.

DETAILS

The terms used in the preceding text have been explained in the introductory part of the specification, and it is thus not necessary to consider them again in detail in this place. The organic solvent dimethoxyethane is known per se from literature and, in connection with the present field of application, the two above-cited patent applications are explicitly referred to. The alkanols, alkanediols, and alkoxyalkanols include, in particular, $C_1$ to $C_5$ alkanols, $C_2$ or $C_3$ alkanediols (or even oligomeric or polymeric individuals which have units comprising these alkanediols), and ($C_1$ to $C_4$)alkoxy($C_2$ or $C_3$)alkanols; methanol, ethanol, isopropanol, tert.-butanol and ethylene glycol [ethanediol (1,2)] are preferred. Each of these organic solvents is optionally present in the alkalization and/or etherification mixture, either individually or in mixtures, especially in mixtures containing dimethoxyethane. Depending on the etherifying agent(s), i.e. depending on the type(s) of ether substituent(s) to be achieved and provided that mixtures are employed—it is fundamentally possible to use any mixing ratios among the solvents, particularly between dimethoxyethane and the other organic solvent(s); preferably, however, not more than 50% by weight, particularly from 0.1 to 30% by weight, of alkanols, alkanediols and/or alkoxyalkanols are added to dimethoxyethane.

Of the etherifying agents which are suitable for use in the process variants, ethylene oxide, propylene oxide, methyl chloride, and/or monochloroacetic acid or one of their salts or hydrolyzable derivatives is preferred. The process of the invention may, for example, be conducted with an organic solvent being present in both etherification steps (b) and (d) and optionally also in the alkalization step (a); it is, however, preferred to conduct the process in such a way that an organic solvent is present in the etherification step (b) and optionally also in the alkalization step (a) and is, together with the other components which have boiling points below the boiling point of water, removed from the mixture by distillation before the beginning of step (c). This last-mentioned variant is especially used in those cases in which ethylene oxide or propylene oxide is used as the etherifying agent in etherification step (b) and methyl chloride is used in etherification step (d), and in which the organic solvent comprises dimethoxyethane and/or isopropanol and, optionally, methanol. It is thus particularly possible to employ a high surplus of alkylene oxide in the first etherification step, for example, in order to achieve reaction times which are as short as possible or to effect a more uniform distribution of substitution over the molecular chains of the cellulose ethers. This surplus can then be decreased by simple evaporation, before the second etherification step is carried out and can be reused in the process, without any further purification (recycling). All process variants should yield water-soluble products, i.e. the products have DS and/or MS values which effect solubility in water; this means, in particular, that the products are water-soluble to the extent of at least 90%, particularly at least 97%.

The process of the present invention can be discontinuously or continuously conducted, using one or several of the apparatuses known from cellulose ether chemistry (for example, kneaders, agitator vessels or impeller mixers). If the temperature level of the etherifying mixture is selected so that it is higher than the boiling point of the mixture of organic solvent/$H_2O$, it is advisable to carry out the process according to the invention in a pressure apparatus; it is also customary to carry out the reaction in a pressure apparatus if reactants are used which are in a gaseous state under normal conditions (standard pressure and room temperature), for example, if ethylene oxide is used as the etherifying agent. The quantities of components indicated below, reflect only the sum of the quantities of the components required for the reaction at the beginning of the respective etherifying step; in the case of the separate alkalization step, part of the cellulose and the alkali-metal hydroxide is, at that time, already in the form of alkali cellulose, or when, for example, the etherifying agent is introduced into the reaction mixture in the form of acid (e.g. monochloroacetic acid for the preparation of CMC), additional quantities of base must be used for neutralization.

The cellulose employed is either of natural origin, for example, cotton linters or wood pulp, or is in a regenerated form, such as cellulose hydrate; the particle size of the cellulose before the beginning of the reactions should, as far as possible, be less than about 2.5 mm, in particular less than about 1 mm, it being possible to achieve this particle size, for example, by grinding cellulose which is supplied in a longer-fibered form into "powders". In the process of the present invention—compared with prior art processes—the same efficiency can be obtained, when particle sizes are employed, which are otherwise rather not used.

The bases are preferably used as an alkali-metal hydroxide—usually NaOH, but also KOH or LiOH—in a solid form or in a dissolved form as an aqueous alkali-metal hydroxide solution (for example, in the form of a 10 to 50% strength by weight solution); it is, however, also possible to use ammonium bases. In th process of the invention it is preferred to employ from about 1 to 30 parts by weight, in particular from about 2 to 18 parts by weight, of organic solvent per 1 part by weight of cellulose. Provided that the bases comprise alkali-metal hydroxides, they are generally present in the respective step in a quantity of from 0.5 to 12.0 moles, in particular from 0.8 to 6.0 moles, per 1 mole of cellulose (calculated on the basis of an anhydro-D-glucose unit); this quantity is, however, dependent on etherification variant (b) or (d), as previously indicated and in the examples. In steps (a) and (b), the quantity of alkali-metal hydroxide is preferably about 0.5 to 1.5 moles, while it is preferably about 2.0 to 6.0 moles in step (c) [at least in the preparation of MHEC or MHPC]. The quantity of water in the reaction mixture is advantageously selected as a figure within the range from 5 to 25 moles per 1 mole of cellulose; or, if the mixture of liquids (organic solvent/water) is intended to serve as a reference quantity, the quantity of water in the mixture is 3 to 40% by weight. Etherifying agents which are preferably employed are $C_1$ to $C_3$ alkyl chlorides, $C_2$ to $C_4$ alkylene oxides and/or $C_2$ to $C_4$ chloroalkanoic acids or the salts of hydrolyzable esters thereof, in particular, methyl chloride, ethyl chloride, ethylene oxide, propylene oxide and/or monochloroacetic acid or a corresponding salt or ester. It is, however, also possible to carry out reaction with butylene oxide-1,2, monochloropropionic acid, chloroethanesulfonic acid, vinylsulfonic acid, acrylonitrile, chloromethanephosphonic acid, 1-N,N-diethylamino-2-chloroethane or 2,3-epoxypropyltrimethyl-ammonium chloride. The quantity of etherifying agent is, in each case, from 0.05 to 30 moles, particularly from 0.1 to 10 moles, per 1 mole of cellulose. In the particularly preferred process for preparing MHEC or MHPC the molar quantity of etherifying agent is from 0.05 to 2.0 moles in step (b) and from 1.0 to 30 moles in step (d).

In the practice of the process according to the present invention, it is preferred to alkalize the cellulose in a mixture composed of organic solvents, water and alkali-metal hydroxide (or quaternary ammonium base), whereafter the etherifying agents are added in the two above-described steps (depending on the type of etherifying agents used). Alkalization may, however, also be carried out in the absence of organic solvents, which are then added in at least one of the etherification steps. As is known, the reaction mixtures and reaction vessels, which are employed in each case, may also be rinsed with inert gases, for example nitrogen, in order to remove oxygen and thus attain high viscosities of the reaction products; it is also possible to add so-called antioxidants, such as pyrogallol or gallic acid, in order to prevent a reduction in viscosity (depolymerization).

All steps are, as a rule, operated while stirring well. In the separate alkalization step, the process is usually run at room temperature (from 0° to 30° C., in particular from 15° to 30° C.), while etherification takes place particularly successfully at temperatures between 30° and 120° C., in particular at temperatures of up to 110° C. The first etherification step is generally conducted at a lower temperature; thereafter the quantity of base is increased, and the second etherification step is run at a higher temperature. When it is intended to carry out the process without using pressure apparatus, it is advisable to operate it below the boiling points of the organic solvents or of azeotropic mixtures of the organic solvents and water. When, however, a gaseous etherifying agent (such as ethylene oxide or methyl chloride) is employed, operating under normal pressure is not advantageous. The maximum pressure set up in the reaction vessel corresponds to the sum of partial pressures of the components in the reaction mixture.

The times required in the etherification steps are generally between 20 minutes and 8 hours, depending on the reaction temperature. The crude product is first freed from the bulk of the liquid components in a separating device (for example, a centrifuge), preferably after adding acid until the unconsumed bases have been neutralized, and it can then, if desired, be subjected to extraction in order to remove adhering salts. Finally, it is dried and, if desired, ground, mixed with further components or granulated. These methods of working-up, purification and post-treatment are those which are customary in the chemistry of cellulose ethers and they therefore do not require a detailed description.

In addition to the previously-mentioned advantages, the process of the present invention has the following particular advantages: the quantity of base used in the first etherification step, which has basically only a catalytic function in this step, is completely available for consumption in the second etherification step; this applies, in particular, also to the process variant, in which the organic solvents and optionally a surplus of etherifying agent are, for the most part, removed by evaporation after the first and before the beginning of the second etherification step, since the base, in particular an alkali-metal hydroxide, is not removed in the process. Due to the fact that the process steps can basically be independently conducted, the quantitative ratios and process parameters which are required to obtain an optimum product quality and a cost saving and ecologically acceptable procedure, can successfully be set up in each step. The use of organic solvents which are water-soluble or substantially water-soluble, leads to an improvement in the interaction between the components and thus to an improved efficiency of the etherifying agents to be used; this applies, in particular, to the solvent dimethoxyethane or mixtures containing dimethoxyethane.

The cellulose ethers which can be prepared by the process according to the invention are useful in known fields of technology, for example, as thickeners, adhesives, additives in the field of building materials, additives in the field of foodstuffs, or the like.

EXAMPLES

In the examples which follow, parts by weight are related to parts by volume as kg to dm$^3$; percentages relate to weight. Unless otherwise indicated, the viscosity values given were determined in a Hoeppler falling-ball viscosimeter on a 2% strength aqueous solution at 20° C. The "DS" is the degree of substitution, i.e. the average number of substituted OH groups per anhydro-D-glucose unit; in the case of cellulose it is within the range from 0.0 to 3.0. The "MS" is the molar degree of substitution, i.e. the average number of moles of the substituting reagent which have been attached by an ether linkage per mole of anhydro-D-glucose unit; in the case of cellulose it can even be greater than 3.0; it is normally used instead of the DS in order to characterize those substituents on the cellulose ether molecule which can be formed by multiple substitution at an OH group, i.e., for example, in the case of the hydroxyalkyl substituent, because the resulting OH groups of the hydroxyalkyl groups can also be substituted—like the OH groups of the cellulose itself.

EXAMPLE 1

In a stirred autoclave, 172 parts by weight of ground, air-dried pine pulp are mixed with 12.5 parts by weight of dimethoxyethane (90% strength azeotrope with water) per 1 part by weight of cellulose. After rendering inert with nitrogen, 80.8 parts by weight of an about 49.5% strength technical-grade NaOH solution are added and the mixture is stirred for 30 minutes at room temperature. Then 22 parts by weight of ethylene oxide are added, and the dispersion is heated to 70° C. while stirring and is maintained at this temperature for 60 minutes. Thereafter, the reaction mixture is distilled in vacuo to obtain a substantially complete removal of the dispersing auxiliary and, optionally, also of the surplus of ethylene oxide. In the process, the distillate can be collected in a cooled receiver for reuse, either in a new batch or in a continuous procedure. A mixer is then used for intensely mixing the alkaline reaction product with 210 parts by weight of NaOH solution, for 45 minutes at room temperature and the product is then again transferred into the stirred autoclave, where 1250 parts by weight of methyl chloride are added and the mixture is methylated for 1 hour at a reaction temperature of 85° C. Upon separation of the excess etherifying agent, the resulting MHEC is washed salt-free with hot water and is dried. The product obtained forms a clear solution and has a DS$_M$ of 1.70 and a MS$_{HE}$ of 0.30.

EXAMPLE 2

Example 1 is repeated, however, hydroxyethylation is carried out for only 30 minutes at a reaction temperature of 70° C., and the reaction mixture is then, without distillation, directly cooled to room temperature. Then 236 parts by weight of aqueous NaOH solution are metered in, and the dispersion is stirred for 30 minutes. Thereafter, the strongly-alkaline dispersion is heated to 70° C., the dispersing auxiliary is distilled off, as indicated in Example 1, and methylation is carried out, after adding 1250 parts by weight of methyl chloride. The product obtained after washing with hot water forms a clear solution and has a DS$_M$ of 1.72 and MS$_{HE}$ of 0.21.

EXAMPLE 3

Example 1 is repeated; however, after hydroxyethylation 196 parts by weight of aqueous NaOH solution are added at the reaction temperature and the dispersion is stirred for 30 minutes at 70° C. As indicated in Example 1, the dispersion is then subjected to distillation and is methylated after the addition of 1250 parts by weight of methyl chloride. The rinsed product forms a clear solution and has a DS$_M$ of 1.63 and a MS$_{HE}$ of 0.29.

EXAMPLE 4

Example 3 is repeated; however, hydroxyethylation is carried out with 26.4 parts by weight of ethylene oxide. After hydroxyethylation 283 parts by weight of aqueous NaOH solution are added. The following steps are conducted as previously described. The resulting product forms a clear solution and has a DS$_M$ of 1.81 and a MS$_{HE}$ of 0.36.

EXAMPLE 5

In a first step, alkalization is carried out as indicated in Example 1. After adding 58 parts by weight of propylene oxide, the dispersion is heated to 105° C. and is maintained at this temperature for 60 minutes. It is then cooled to 70° C., and vacuum distillation is carried out to remove the dispersing auxiliary and the surplus of propylene oxide. The distillate contains about 33% of the propylene oxide employed. The alkaline reaction product is intensely mixed with 178 parts by weight of aqueous NaOH solution for 30 minutes at room temperature and is then methylated with 1250 parts by weight of methyl chloride in the stirred autoclave, as indicated in Example 1. After washing with hot water, a product is obtained, which forms a clear solution and has a DS$_M$ of 1.60 and a MS$_{HP}$ of 0.28.

EXAMPLE 6

Alkalization is first carried out as indicated in Example 1. After the addition of 29 parts by weight of propylene oxide and hydroxypropylation for 60 minutes at 105° C., the dispersion is cooled to 70° C. 236 parts by weight of aqueous NaOH solution are added and alkalization is run for 30 minutes at 70° C. Then vacuum distillation is carried out, in which the azeotrope used as the dispersing auxiliary and propylene oxide in an amount of 30% (relative to the amount of propylene oxide employed) are recovered in the form of a distillate. The reaction mixture remaining after distillation is methylated with a surplus of methyl chloride, as indicated in Example 5. The rinsed product forms a clear solution and has a DS$_M$ of 1.78 and a MS$_{HP}$ of 0.15.

EXAMPLE 7

In a mixer, 172 parts by weight of ground, air-dried pine pulp are mixed with 3 parts by weight of dimethoxyethane (90% strength azeotrope) per 1 part by weight of cellulose. 80.8 parts by weight of aqueous NaOH solution are added, and mixing is continued for 45 minutes at room temperature. After adding 8.8 parts by weight of ethylene oxide, the reaction mixture is heated to 70° C. while constantly mixing and reaction is carried out within 60 minutes. Thereafter, 242 parts by weight of aqueous NaOH solution are admixed at 70° C., during a period of 10 minutes, and the dispersing auxiliary is then distilled off; the distillate contains less than 0.01% of ethylene oxide. The reaction mixture which has a temperature of about 35° to 40° C., is admixed with 3 parts by weight of aqueous 96% strength dimethoxyethane and 191.5 parts by weight of methyl chloride. The mixture is then heated to 100° C. and is maintained at this temperature for 60 minutes, while constantly mixing. Upon completion of the reaction, the vaporizable by-products and the dimethoxyethane are evaporated in vacuo. The MHEC thus obtained is washed salt-free; it forms a clear solution and has a $DS_M$ of 1.69 and an $MS_{HE}$ of 0.14.

EXAMPLE 8

Example 7 is repeated; however, distillation is carried out directly after hydroxyethylation at 70° C.; the distillate obtained contains less than 0.01% of ethylene oxide. Subsequently, 3 parts by weight of dimethoxyethane (90% strength azeotrope) per 1 part by weight of cellulose and then 242 parts by weight of aqueous NaOH solution are added. Alkalization is effected within 10 minutes at 40° C., while constantly mixing. After adding 191.5 parts by weight of methyl chloride, the reaction mixture is methylated and worked up as indicated in Example 7. The rinsed product forms a clear solution and has a $DS_M$ of 1.72 and a $MS_{HE}$ of 0.14.

EXAMPLE 9

Example 7 is repeated; however, the distillation is not carried out; instead hydroxyethylation at 70° C. is followed by the addition of 202 parts by weight of aqueous NaOH solution and alkalization is run for 30 minutes, while cooling to about 40° C. and constantly mixing. Then 252 parts by weight of methyl chloride are added, and the mixture is heated to a temperature in the range from 85° to 90° C. Methylation is completed after 1 hour. The vaporizable by-products, excess methyl chloride and dimethoxyethane are distilled off in vacuo. The product which has been washed salt-free with hot water forms a clear solution and has a $DS_M$ of 1.75 and a $MS_{HE}$ of 0.15.

EXAMPLE 10

Example 7 is repeated, however, after hydroxyethylation, 263 parts by weight of aqueous NaOH solution are added to the mixture which is then alkalized for 10 minutes at 70° C., while constantly mixing. Thereafter, dimethoxyethane is distilled off in vacuo; the distillate does not contain any ethylene oxide. The reaction mixture which has a temperature of about 40° C. is admixed with 378 parts by weight of methyl chloride and is heated to a temperature in the range from 85° to 90° C.; at this temperature, methylation is carried out within 1 hour. The excess methyl chloride is distilled off, together with the vaporizable by-products. The MHEC obtained after washing with hot water has a $DS_M$ of 1.64 and a $MS_{HE}$ of 0.13.

EXAMPLE 11

Example 7 is repeated; however, the distillation is not carried out, but 5 parts by weight of dimethoxyethane (100% strength) are added, followed by mixing at room temperature with 162 parts by weight of aqueous NaOH solution within 30 minutes. Then 172 parts by weight of methyl chloride are added, and the mixture is heated to 100° C. To allow reaction to go to completion, the mixture is maintained at 100° C. for 90 minutes; after the end of the reaction, pressure in the reaction vessel is reduced, and the cooled mixture is mechanically separated from dimethoxyethane. After washing with hot water in the usual manner, the product forms a clear solution and has a $DS_M$ of 1.62 and a $MS_{HE}$ of 0.14.

EXAMPLE 12

In a mixer 172 parts by weight of ground, air-dried pine pulp, pre-mixed with 5 parts by weight of aqueous dimethoxyethane (90% strength azeotrope) per 1 part by weight of cellulose, are rendered inert and admixed with 80.8 parts by weight of aqueous NaOH solution. The mixture is alkalized for 45 minutes at a temperature in the range from 20° to 25° C. Then 88 parts by weight of ethylene oxide are added, and the reaction mixture is heated to 70° C., within a period of 45 minutes. The reaction is completed in the course of 60 minutes. Thereafter, the dispersing auxiliary is distilled off in vacuo. After evaporation, the mixture which has a temperature in the range from 35° to 40° C., is admixed with 3 parts by weight of isopropanol (87% strength azeotrope) per 1 part by weight of cellulose, 72.7 parts by weight of aqueous NaOH solution are added, and the mixture is alkalized for 30 minutes at a temperature in the range from 35° to 40° C. Then, 106.3 parts by weight of an aqueous, 80% by weight strength solution of monochloroacetic acid are metered in. The mixture is heated to 75° C. in 30 minutes, and reaction is carried out within 60 minutes. The isopropanol is then removed in known manner by vacuum distillation and can be reused. If required, the resulting CMHEC can be neutralized and washed. Analysis shows a $MS_{HE}$ of 1.25 and a $DS_{CM}$ of 0.67.

The invention and its advantages are readily appreciated from the preceding description. Various changes may be made in the process without departing from the spirit and scope of the invention or sacrificing its material advantages. The process hereinbefore described is merely illustrative of preferred embodiments of the invention.

TABLE

| Example | Type of Product | Molar Quantities added per Mole of Cellulose of | | | | Quantities of Organic Solvent present in Parts by Weight per Part by Weight of Cellulose | | |
|---|---|---|---|---|---|---|---|---|
| | | NaOH | | Etherifying Agent | | | | |
| | | in step a | before step c | in step b | in step d | in step a | in step b | in step d |
| 1 | MHEC | 1.0 | 2.60 | 0.5 | 25 | 11.2 | 11.2 | — |
| 2 | MHEC | 1.0 | 2.90 | 0.5 | 25 | 11.2 | 11.2 | — |
| 3 | MHEC | 1.0 | 2.40 | 0.5 | 25 | 11.2 | 11.2 | — |
| 4 | MHEC | 1.0 | 3.50 | 0.6 | 25 | 11.2 | 11.2 | — |
| 5 | MHPC | 1.0 | 2.20 | 1.0 | 25 | 11.2 | 11.2 | — |
| 6 | MHPC | 1.0 | 2.90 | 0.5 | 25 | 11.2 | 11.2 | — |
| 7 | MHEC | 1.0 | 3.00 | 0.2 | 3.8 | 2.7 | 2.7 | 2.9 |
| 8 | MHEC | 1.0 | 3.00 | 0.2 | 3.8 | 2.7 | 2.7 | 2.7 |

TABLE-continued

| Example | Type of Product | Molar Quantities added per Mole of Cellulose of | | | | Quantities of Organic Solvent present in Parts by Weight per Part by Weight of Cellulose | | |
|---|---|---|---|---|---|---|---|---|
| | | NaOH | | Etherifying Agent | | | | |
| | | in step a | before step c | in step b | in step d | in step a | in step b | in step d |
| 9 | MHEC | 1.0 | 2.50 | 0.2 | 5.0 | 2.7 | 2.7 | 2.7 |
| 10 | MHEC | 1.0 | 3.25 | 0.2 | 7.5 | 2.7 | 2.7 | — |
| 11 | MHEC | 1.0 | 2.00 | 0.2 | 3.4 | 2.7 | 2.7 | 7.7 |
| 12 | CMHEC | 1.0 | 1.90 | 2.0 | 0.9 | 4.5 | 2.6 | 2.6 |

What is claimed is:

1. A process for preparing a water-soluble mixed cellulose ether which comprises the following steps:
   (a) alkalizing cellulose in a reaction medium containing water and base to produce an alkali cellulose,
   (b) etherifying the resulting alkali cellulose, in a reaction medium containing water and base, with at least one etherifying agent which requires a catalytic and sub-stoichiometric quantity of base for reaction with cellulose,
   (c) increasing the quantity of base,
   (d) further etherifying the cellulose ether, obtained from step (b) and combined with additional base in step (c), in a water-containing reaction medium with at least one etherifying agent which requires, for reaction with cellulose:
      (i) an at least stoichiometric quantity of base or
      (ii) a catalytic and sub-stoichiometric quantity of base which is in excess of that used in step (a);
   at least one organic solvent selected from the group consisting of dimethoxyethane, alkanol, alkanediol and alkoxyalkanol being a dispersing auxiliary in at least one of steps (a), (b) and (d).

2. A process as claimed in claim 1 wherein each etherifying agent for step (b) is a compound of the formula

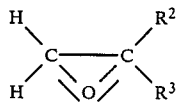

wherein each of $R^2$ and $R^3$ is, independently, a hydrogen atom (H) or alkyl having from 1 to 13 carbon atoms.

3. A process as claimed in claim 2 wherein each etherifying agent for step ($d_i$) is a compound of the formula

in which
$R^1$ is $C_{1-15}$ alkyl, $C_{7-15}$ aralkyl, carboxy($C_{1-3}$ alkyl), sulfono($C_{1-3}$ alkyl), phosphono($C_{1-3}$ alkyl), $C_{1-6}$ hydroxyalkyl or N,N-dialkylaminoalkyl in which each alkyl has from 1 to 3 carbon atoms and
Hal is chloro or bromo.

4. A process as claimed in claim 1 wherein each etherifying agent for step ($d_i$) is a compound of the formula

in which
$R^1$ is $C_{1-15}$ alkyl, $C_{7-15}$ aralkyl, carboxy($C_{1-3}$ alkyl), sulfono($C_{1-3}$ alkyl), phosphono($C_{1-3}$ alkyl), $C_{1-6}$ hydroxyalkyl or N,N-dialkylaminoalkyl in which each alkyl has from 1 to 3 carbon atoms and
Hal is chloro or bromo.

5. A process as claimed in claim 1 wherein the alkanol has from 1 to 5 carbon atoms, the alkanediol has 2 or 3 carbon atoms and the alkoxyalkanol is a ($C_{1-4}$ alkoxy)($C_2$ or $_3$ alkanol).

6. A process as claimed in claim 2 wherein the alkanol has from 1 to 5 carbon atoms, the alkanediol has 2 or 3 carbon atoms and the alkoxyalkanol is a ($C_{1-4}$ alkoxy)($C_2$ or $_3$ alkanol).

7. A process as claimed in claim 3 wherein the alkanol has from 1 to 5 carbon atoms, the alkanediol has 2 or 3 carbon atoms and the alkoxyalkanol is a ($C_{1-4}$ alkoxy)($C_2$ or $_3$ alkanol).

8. A process as claimed in claim 4 wherein the alkanol has from 1 to 5 carbon atoms, the alkanediol has 2 or 3 carbon atoms and the alkoxyalkanol is a ($C_{1-4}$ alkoxy)($C_2$ or $_3$ alkanol).

9. A process as claimed in claim 2 wherein the etherifying agent comprises a compound selected from the group consisting of ethylene oxide and propylene oxide.

10. A process as claimed in claim 3 wherein the etherifying agent for step ($d_i$) comprises a member selected from the group consisting of methyl chloride, monochloracetic acid, a salt of monochloroacetic acid and a hydrolyzable derivative of monochloroacetic acid.

11. A process as claimed in claim 4 wherein the etherifying agent for step ($d_i$) comprises a member selected from the group consisting of methyl chloride, monochloracetic acid, a salt of monochloroacetic acid and a hydrolyzable derivative of monochloroacetic acid.

12. A process as claimed in one of claims 1 to 11 wherein the reaction medium for each of steps (b) and (d) comprises organic solvent.

13. A process as claimed in one of claims 2 to 11 wherein the reaction medium for step (b) comprises organic solvent and wherein the organic solvent, together with each other reaction mixture component which has a boiling point below that of water, is removed from the reaction mixture by distillation prior to step (d).

14. A process as claimed in claim 1 wherein the reaction medium for step (b) comprises organic solvent and wherein the organic solvent, together with each other reaction-mixture component which has a boiling point below that of water, is removed from the reaction mixture by distillation prior to step (d).

15. A process as claimed in claim 14 wherein the reaction medium for step (a) comprises organic solvent.

* * * * *